United States Patent [19]

Wilcox

[11] Patent Number: 4,924,909

[45] Date of Patent: May 15, 1990

[54] SEMI-BALANCED STAGGERED LOCKING COUPLING

[75] Inventor: Wayne Wilcox, Union City, Pa.

[73] Assignee: Snap-Tite, Inc., Union City, Pa.

[21] Appl. No.: 325,863

[22] Filed: Mar. 20, 1989

[51] Int. Cl.⁵ ............................................. F16L 37/28
[52] U.S. Cl. .............................. 137/614.05; 137/614.03
[58] Field of Search ..................... 137/614.05, 614.03; 251/281, 282

[56] References Cited

U.S. PATENT DOCUMENTS

| | | | |
|---|---|---|---|
| 2,765,181 | 10/1956 | Butterfield | 137/614.03 |
| 3,039,794 | 6/1962 | De Cenzo | 137/614.03 |
| 3,613,726 | 10/1971 | Torres | 137/614.03 |
| 4,200,121 | 4/1980 | Walter et al. | 137/614.05 |

Primary Examiner—A. Michael Chambers
Attorney, Agent, or Firm—Woodling, Krost & Rust

[57] ABSTRACT

A semi-balanced valve utilizing a two stage locking with the movable valve sleeve in the nipple locked to the body of the coupler for physical as well as spring loaded movement between open and closed positions.

4 Claims, 2 Drawing Sheets

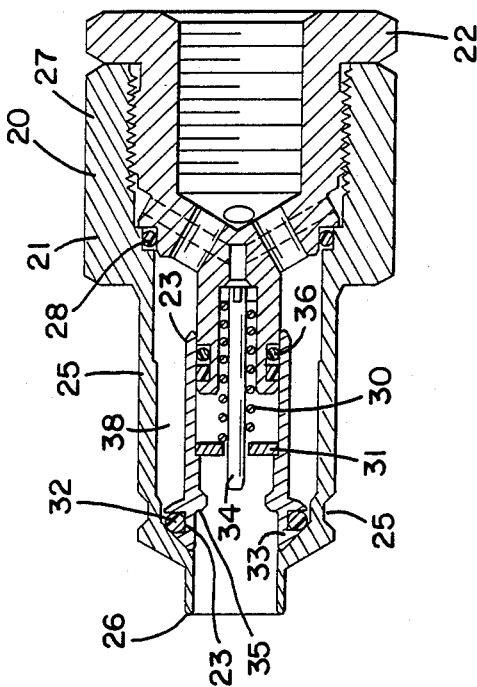
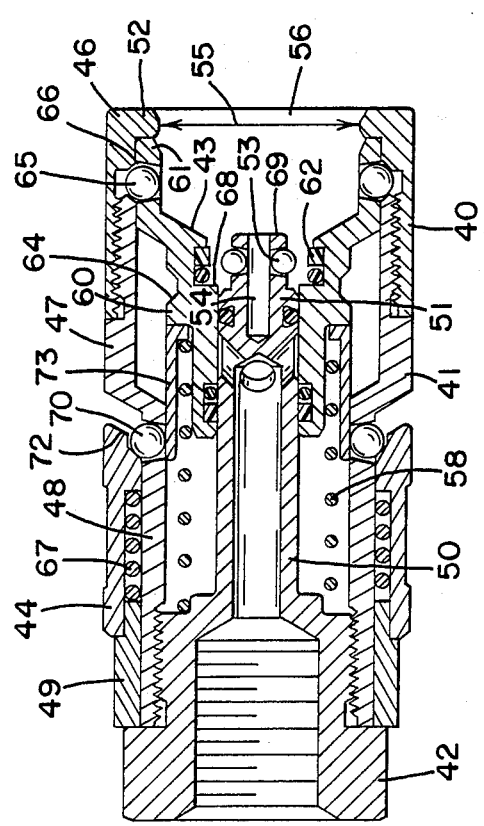
FIG. 3
FIG. 2

4,924,909

SEMI-BALANCED STAGGERED LOCKING COUPLING

The present invention relates to a semi-balanced coupling for selectably and releasably joining hydraulic lines. Semi-balanced valves are known in the art. U.S. Pat. No. 3,613,726 - Balanced Pressure Coupling - and U.S. Pat. No. 3,464,436 - Self Cleaning Fluid Coupling - are examples. However, these valves are prone to leakage and other problems.

OBJECTS OF THE INVENTION

It is an object of this invention to provide a semi-balanced coupling with valves that are returned to a closed position by the act of separating the nipple from the coupler.

It is an object of this invention to separate the primary coupling lock from the nipple.

It is an object of this invention to simplify the design of the semi-balanced couplings.

It is an object of this invention to increase the longevity of semi-balanced couplings.

Other objects and a more complete understanding of the invention may be had by referring to the specification and drawings in which:

DESCRIPTION OF THE DRAWINGS

FIG. 2 is a longitudinal cross-sectional view of the coupler of FIG. 1, and FIG. 3 is a longitudinal cross-sectional view of the nipple of FIG. 1.

SPECIFICATION

Figure 1:
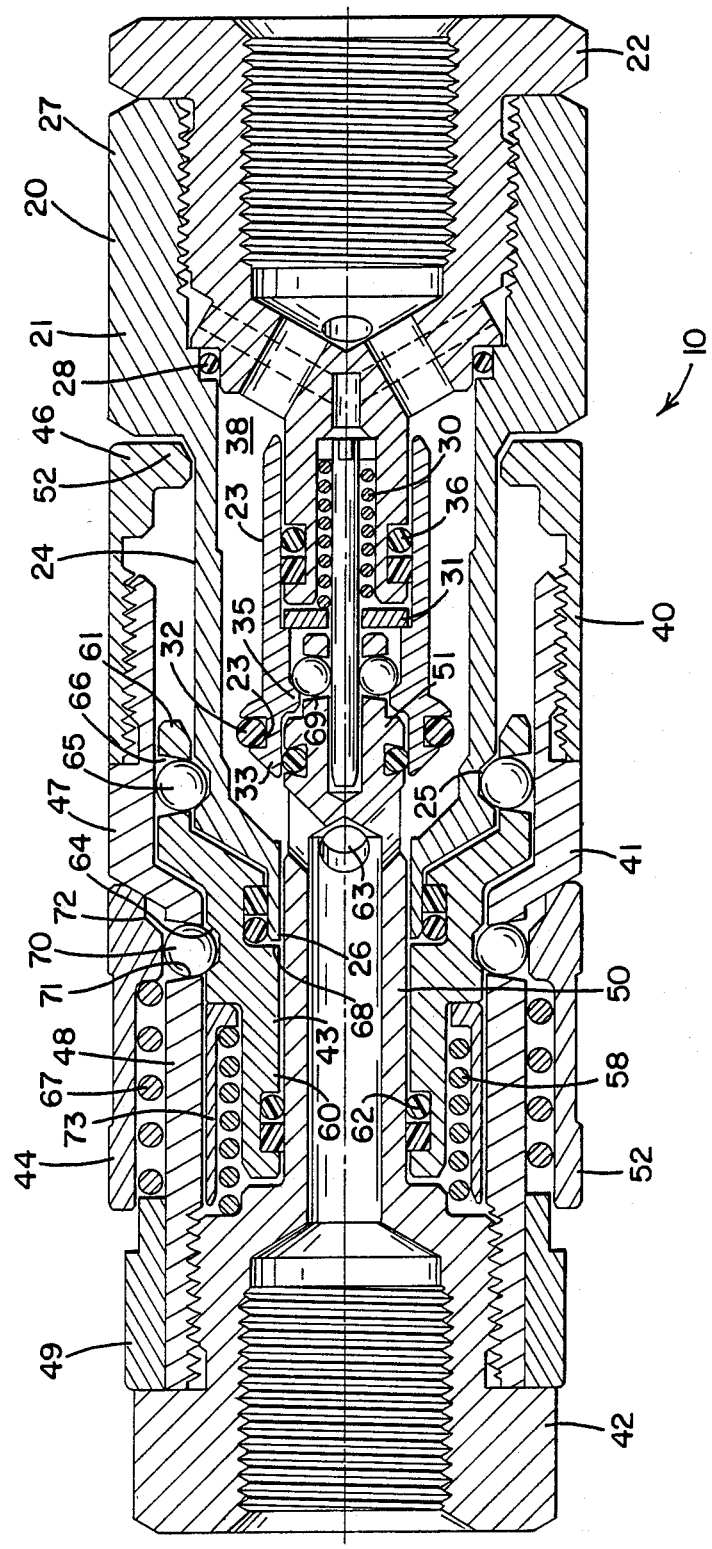
FIG. 1 is a longitudinal cross-sectional view of a semi-balanced coupling with the nipple in its in use position within the coupler.

The present invention is described in its preferred embodiment of a semi-balanced coupling 10. The coupling 10 includes a nipple 20 and a coupler 40.

The nipple 20 is the male member for the coupling 10. The nipple 20 includes a body 21, an adaptor 22 and an internal valve slide 23. The nipple 20 shown is a semi-balanced design (wherein the valve 23 normally cannot be moved when in a closed under pressure position). The body 21 of the nipple 20 has generally cylindrical main section 24 located between a reduced diameter nose 26 and an enlarged diameter finger grasp termination section 27. The cylindrical main section 24 of the body 21 of the nipple 20 has a circumferentially extending ball race 25 formed near the nose 26 (purpose later described). The body 21 also has an angled front face near the nose to facilitate alignment of the nipple into the coupler 40. The adaptor 22 is located within the enlarged diameter termination section 27 to interconnect the nipple 20 to an associated hose or fitting (not shown). Interchangeable adaptors 22 allow a single nipple 20 to be used with a variety of hose or fitting sizes. An O-ring seal 28 prevents leakage about the outer diameter of the adaptor 22. The internal slide valve 23 is located within the hollow inside of the main section 24 of the body 21 of the nipple 20 surrounding an internal guide member 29 for longitudinal motion between open (FIG. 1) and closed (FIG. 3) positions. A valve spring 30 biases the slide valve 23 towards its closed position (a washer 31 connects the spring 30 to the slide valve 23). In the valves 23 closed position an O-ring 32 near the leading edge 33 of the valve 23 seats against a neighboring internal shoulder of the body 21 of the nipple 20 so as to stop leaks in the valves 23 closed positions. The valve 23 itself also has an internal shoulder 35 neighboring the internal guide member 29 (purpose later described. Note - an internal ball race could also be used.). The valve 23 is sealed to an internal guide member 29 of the body 21 of the nipple 20 by an O-ring seal 36. The incorporation of this seal 36 inside the valve 23 on its internal diameter allows the fluid passage 38 to have a larger cross-sectional area then if the valve was sealed on its external diameter. A pin 34 extends from within the internal guide member (and the spring 30) to a point beyond the end of such guide member 29 (for a purpose later described).

The coupler 40 is the female member for the coupling 10. The coupler 40 includes a body 41, an adaptor 42, a valve sleeve or intermediate member 43 and a locking sleeve 44. The coupler 40 shown is a balanced design (wherein the valve sleeve 43 can be moved when in a closed position under pressure). The body 41 of the coupler 40 is made up of a number of separate pieces 46-49 as well as an internal part 50 of the adaptor 42 for ease of construction. These parts 46-50 act as an integral whole, forming a body 41 having an internal cylindrical projection 51 within an outer cylindrical body 52. The inner diameter 55 of the nipple opening in the outer body 52 is slightly more than the outer diameter of the main section 24 of the body 21 of the nipple 20. The outer diameter of the internal projection 51 is slightly less than the inner diameter of the nose 26 of the body 21 of the nipple 20 (for reasons later described). The end of the internal projection 51 has a pair of locking balls 53 trapped therein for a measure of radial movement in respect thereto. A central hole 54 extends next to the inside of the balls 53 from the end of the internal projection 51 (purpose of hole 54 and balls 53 later described). The diameter of the balls 53 are slightly more than the thickness of the projection 51 surrounding the hole 54. The valve sleeve 43 is located between the internal projection 51 and outer body 52 of the coupler 40 for longitudinal motion in respect thereto between open (FIG. 1) and closed (FIG. 2) positions. A valve spring 58 biases the valve sleeve 43 towards its closed position. The valve sleeve 43 itself has a reduced diameter section 60 and an enlarged diameter section 61. The reduced diameter section 60 slides along the internal projection 51 of the body 41 of the coupler 40. O-ring seals 62 on either side of a fluid opening 63 in such projection 51 seal the valve against leakage. The reduced diameter section 60 of the valve sleeve 55 has a circumferentially extending ball race 64 formed therein (purpose later described). The enlarged diameter section 61 of the valve sleeve 55 has an inner diameter again a little more than them outer diameter of the main section 24 of the body 21 of the nipple 20. A nipple locking ball 65 is positioned in a conical pocket 66 in such enlarged diameter section 61 (for purposes later described). The locking sleeve 44 surrounds the body 41 of the coupler for longitudinal motion in respect thereto between locked (FIG. 1) and unlocked (FIG. 2) positions. A spring 67 biases the locking sleeve 44 towards its locked position. Locking balls 70 are located in holes 71 in the body 41 of the coupler 40 between an angular end surface 72 of the locking sleeve 44 and a positioning collar 73 attached to the valve sleeve 43. The positioning collar 73 provides a convenient pocket for the spring 58 as well as providing a measure of contaminant protection for the inside of the coupler 40 (by closing the holes 71).

The adaptor 42 interconnects the coupler 40 to an associated hose or fitting (not shown). Interchangeable adaptors allow a single coupler 40 to be used with a variety of hose or fitting sizes.

To join the nipple 20 (FIG. 3) to the coupler 40 (FIG. 2) one positions the nipple 20 axially in line with the coupler 40. One then pushes the two together. The nipple locking ball 65 of the coupler 40 is deflected outwards so as to allow the leading edge of the main section 24 of the body 21 of the nipple 20 to pass. The nipple locking ball 65 then drops into the circumferential ball race 25 of such main section 24. With further movement the nose 26 of the nipple 20 engages the internal shoulder 68 of the valve sleeve 55 of the coupler 40 and the end 69 of the internal projection 51 of the body 52 of the coupler 40 engages the internal shoulder 35 of the valve 23 of the nipple 20. Simultaneously the pin 34 enters the hole 54 in the projection 51. This pushes the balls 53 outwards to lock into place behind the internal shoulder 35 of the valve 23 of the nipple 20. This connection physically locks the valve 23 of the nipple 20 to the projection 51 of the coupler 40. Upon the application of further pressure the valve sleeve 43 of the coupler 40 (physically locked to the body 25 of the nipple 20 via the balls 65) and valve 23 of the nipple 20 (physically locked to the projection 51 of the coupler 40 by balls 53) are moved into their open positions while the nipple 20 and coupler 40 are joined. As soon as the nipple 20 and coupler are fully joined the locking ball 70 drops into the circumferentially extending ball race 64 in the valve sleeve 43 and the locking sleeve 44 moves across the balls 70 to its locked position. The nipple 20 is then fixedly locked to the coupler 40 as shown in FIG. 1. Note that in the coupler 10 described the balls 65 drop inward into the race 25 of the nipple 20 and the balls 53 are pushed outward to engage the shoulder 35 of the valve 23 substantially simultaneously. This is preferred as this positioning also corresponds to the closing of the valve 43 of the coupler 40 and the closing of the valve 23 of the nipple 20. By slightly altering the various dimensions of the device a sequential action could be provided.

To release the nipple 20 from the coupler 40 the locking sleeve 44 is manually moved to its unlocked position (FIG. 2). This allows the locking balls 70 to retract from the ball race 64 in the valve sleeve 43. The valve sleeve 43 and nipple 20 (still joined by the nipple locking balls 65) can then be moved axially of the coupler 40 until the valve sleeve 43 of the coupler 40 and valve 23 of the nipple 20 are again seated in their closed positions. Since the valve 23 of the nipple 20 is physically connected to the projection 51 of the coupler 40 via the balls 53 the valve 23 must also be seated before any separation can occur. When the nipple locking balls 65 are again aligned with their recess in the body 41 of the coupler 40 the pin 34 has also been positioned such that it no longer holds the balls 53 outwards in contact with the shoulder 35 of the valve 23 of the nipple 20. The nipple locking balls 65 can then move outwards so as to allow passage of the end of the main section 24 of the body 21 of the nipple 20 and the balls 53 can move inward to allow separation of the valve 23 from the projection 51 and thus the separation of the nipple 20 from the coupler 40. The mechanical connection between the valve sleeve 43 and the nipple 20 and the valve 23 and the coupler 40 act to insure the proper seating of the valves before separation. The mechanical seating is in addition to that accomplished by the springs in the coupler 10, thus minimizing leakage under all conditions (spring breakage, sticking valves, contaminated valves, etc.).

Although this invention has been described in its preferred embodiment with a certain degree of particularity, it is to be realized that numerous changes may be made without departing from the invention as hereinafter claimed. For example: the internal projection 51 of the coupler 40 and the guide member 29 of the nipple 20 are shown as integral with their adaptors 42, 22 respectively. This facilitates construction and alignments. The adaptors 42, 22 could, however, be made separate from these parts. Additional example: the coupling 10 shown and described has a balanced coupler 40 with an unbalanced nipple 20. The invention could also be used in any coupler wanting physical valve closure before separation. Other modifications are also possible.

What is claimed is:

1. A coupling comprising a nipple, said nipple having a valve sleeve with a seated position and a body with an outer diameter and a guide member and a pin, a first ball race in said body, said valve sleeve surrounding said guide member for longitudinal movement in respect thereto, said valve sleeve having an internal locking means, a coupler, said coupler having an opening and a first ball hole and an internal projection, said internal projection having an external diameter and an external locking means, said pin of said body of said nipple selectively locking said external locking means of said internal projection of said coupler to said internal locking means of said nipple when said valve sleeve is other than in its seated position, an intermediate member, said intermediate member being located in said opening in said coupler about said internal projection, said intermediate member having two sections, one section of said intermediate member having an inner diameter for acceptance of said body of said nipple therein and an outer diameter, said one section of said intermediate member having a first ball for engaging said first ball race in said body of said nipple, means to lock said first ball of said one section of said intermediate member into said first ball race in said body of said nipple to selectably retain said body of said nipple in respect to said intermediate member, the other section of said intermediate member having an outer diameter smaller than said outer diameter of said one section of said intermediate member, a second ball race, said second ball race being in said other section of said intermediate member, a second ball, said second ball being in said second ball hole in said coupler for selective engagement with said second ball race in said other section of said intermediate member, a locking sleeve, and said locking sleeve selectably moveable for locking said second ball in said second ball hole in said coupler in engagement with said second ball race in said other section of said intermediate member to selectably retain said intermediate member in respect to said coupler.

2. The valve of claim 1 wherein the nipple and coupler both have a longitudinal axis and said second ball race of said intermediate member being displaced from the axis of the coupler by substantially the same distance as the first ball race of the nipple from the axis of the nipple.

3. In a coupling having a nipple with a valve sleeve longitudinally movable between open and closed positions and a coupler having an internal projection, the internal projection moving the valve sleeve to an open position upon engagement of the nipple with the coupler, the improvement of the valve sleeve surrounding part of the internal projection, an internal locking part on the inside of the valve sleeve surrounding part of the internal projection, an external locking part on the internal projection, said external locking part being movable and locking directly to said internal locking part of the valve sleeve when the valve sleeve is in its open position, a pin, said pin being connected to the nipple, said pin located within the valve sleeve, said pin having an outer end, said outer end of said pin being located inwardly of said internal locking part on the inside of the valve sleeve, said pin being immovable in respect to the valve seat, and said pin moving said external locking part of the internal projection of the coupler to lock said external locking to said internal locking part of the valve sleeve when the valve sleeve is in its open position.

4. The coupling of claim 3 characterized in that the internal projection of the coupler engages the valve sleeve substantially simultaneously with said pin engaging said external locking part of the internal projection upon engagement of the nipple with the coupler.

* * * * *